United States Patent [19]

Roth et al.

[11] 4,230,474
[45] Oct. 28, 1980

[54] APPARATUS AND PROCESS FOR SIMULTANEOUS THERMIC GLASS SHEET HARDENING

[75] Inventors: Mario Roth, Aachen; Johann Winandy, Herzogenrath; Hans-Pieter Siemonsen, Aachen, all of Fed. Rep. of Germany

[73] Assignee: Saint-Gobain Industries, Neuilly-sur-Seine, France

[21] Appl. No.: 963,436

[22] Filed: Nov. 17, 1978

[30] Foreign Application Priority Data

Nov. 22, 1977 [FR] France ................... 77 34987

[51] Int. Cl.³ .............................................. C03B 27/04
[52] U.S. Cl. ........................................ 65/114; 65/351; 65/182.2
[58] Field of Search ............... 65/25 A, 114, 182 A, 65/351

[56] References Cited

U.S. PATENT DOCUMENTS

| 2,026,165 | 12/1935 | Goodwillie | 65/351 X |
| 3,293,015 | 12/1966 | Fredley et al. | 65/25 A |
| 3,353,946 | 11/1967 | McMaster | 65/351 X |

FOREIGN PATENT DOCUMENTS

| 853006 | 3/1940 | France . |
| 541049 | 11/1941 | United Kingdom . |
| 773469 | 4/1957 | United Kingdom . |
| 1212208 | 11/1970 | United Kingdom . |

Primary Examiner—Arthur D. Kellogg
Attorney, Agent, or Firm—Pennie & Edmonds

[57] ABSTRACT

The present invention relates to an improved apparatus and process for simultaneous thermic hardening via rapid air cooling of a plurality of glass sheets vertically suspended from a conveyor. The apparatus is characterized by two diametrically opposed caissons, the opposed surfaces of which are each provided with a plurality of compressed air pipes and a means for evacuating the emitted compressed air.

9 Claims, 2 Drawing Figures

APPARATUS AND PROCESS FOR SIMULTANEOUS THERMIC GLASS SHEET HARDENING

TECHNICAL FIELD

The present invention relates to an improved apparatus and process for simultaneous thermic heardening via rapid air cooling of a plurality of glass sheets vertically suspended from a conveyor. The apparatus is characterized by two diametrically opposed caissons, the opposed surfaces of which are each provided with a plurality of compressed air pipes and a means for evacuating the emitted compressed air.

BACKGROUND ART

In the intermittent production of small hardened glass sheets, such as automobile side window panes, the process is as follows:

I. The suspension of several glass sheets by means of pinchers or clamps from a conveyor which moves along a rail;
II. Simultaneously heating the glass sheets in a furnace; and
III. Simultaneously hardening the glass sheets with the assistance of compressed air cooling.

The compressed air cooling utilized in intermittent production is characterized by diametrically opposed caissons having large opposed surface areas equipped with openings for compressed air emissions.

In the prior art process, the progressive working station movement is accomplished by means of jolts or sudden starts. The conveyor from which the glass sheets are suspended moves from one working position to the following one at a preset rhythm.

The intermittent glass sheet hardening process is still advantageous in principle. The hardening of a plurality of relatively small glass sheets is limited by the caisson surface area capacity. Prior art production, however, has shown non-uniformity among suspended glass sheets being hardened. The non-uniformity exists even among sheets located on a common conveyor. The thinner the glass sheets, the more evident is the non-uniformity. For example, in a sheet whose thickness is only 3 mm., the hardening irregularities are such that it is no longer possible to guarantee the degree of fragmentation uniformity necessary in security window panes.

Uniform hardening difficulties normally arise when caissons are either perforated over their frontal surface or have relatively short compressed air cooling pipes. Caissons provided with relatively long pipes, greater than 20 cm., have a less serious air evacuation problem. The air flow exits between the long tubes forming the compressed air cooling pipes. Long pipe caissons, however, present numerous disadvantages that result in industrial utilization of short-pipe caissons whenever possible.

The present invention discloses an improved process and apparatus for simultaneous thermic glass sheet hardening whereby uniform hardening without sheet surface area defects is achieved. The improvement results without a considerable increase in production costs, even where the simultaneous hardening involves a plurality of thin sheets.

DISCLOSURE OF INVENTION

According to the present invention, an improved apparatus for the simultaneous thermic hardening via rapid air cooling of the plurality of co-suspended glass sheets in a neutral position on a common conveyor is characterized by an improvement wherein:

I. a pair of compressed air caissons,
   a. diametrically opposite each other,
   b. having a plurality of compressed air pipes;
   c. dimensioned and configured whereby the two caissons are divided into a plurality of elementary caissons; and
II. the elementary caissons being;
   a. equivalent in number to the glass sheets to be simultaneously hardened;
   b. joined to a common wind box; and
   c. separated by compressed air evacuation channels.

The present invention permits the use of compressed air through short pipe caissons with uniform hardening. The uniformity occurs even where the glass sheets being simultaneously hardened are relatively thin and require an intense cooling because of their weak calorific capacity.

An important aspect of the present invention is an increase in the distance separating conveyed glass sheets. Previously, it was necessary for suspended glass sheets to be spaced as closely as possible on a conveyor. The separation of glass sheets, however, creates compressed air evacuation channels which abet the removal of the air flow. The evacuation channels do not require any special configuration, being defined by the dimensions between elementary caissons. Each elementary caisson is dimensioned and configured whereby the elementary compressed air caisson surface area does not appreciably extend beyond that area necessary for the hardening of each single glass sheet. By enlarging the distance between the adjacent sides of co-suspended glass sheets, the compressed air caisson configuration avoids compressed air accumulation zones. Thus, one can subject the glass sheets to a markedly increased cooling rate not attainable in the prior art. The increased cooling rate is achieved without appreciably modifying the rugged, economical, short pipe, compressed air caisson structure.

According to a preferred embodiment of the present invention the evacuation channels are dimensioned and configured to provide a cross sectional area sufficient to permit the compressed air flow from each elementary compressed air caisson to bleed off into the evacuation channel without risk of confinement.

To assist compressed air outflow, one can provide for intake or suction means acting in the evacuation channels. A particularly effective method for assistant compressed air outflow in the evacuation channels is to position compressed air injectors which are in communication with the wind box on either the elementary compressed air caisson or on the air distribution wind box, thereby creating a Bernoulli effect.

In order to obtain uniform hardening in each glass sheet, it is preferred that the elementary caisson frontal wall presents a curvature corresponding to that of the hardened glass sheet. Both the small compressed air pipe length and aperture separation from the glass sheet's surface should be constant and amount to approximately 30 mm. to 70 mm.

Other objects and advantages of the present invention will become known by the references to the following description and accompanying drawings:

BEST MODE OF CARRYING OUT THE INVENTION

A conveyor 10 moves along the axis 2 across the different work stations of a simultaneous hardening line via a rail (not shown). Three identical glass sheets 12 are supported via a suspension device. The clamps or clasps of the suspension device 14 hold the glass sheets by their upper edges. The glass sheets preferably have a thickness of about 3 mm. and have been rendered convex at a previous work station.

Preferably, the progression of the conveyor among work stations is sequenced with respect to the elementary caisson positioning. Specifically, the conveyor movement is coordinated as a multiple of the interval spacing whereby each glass sheet is positioned adjacent the elementary caisson. The processed sheets will serve as automobile side windows.

Figure 1:
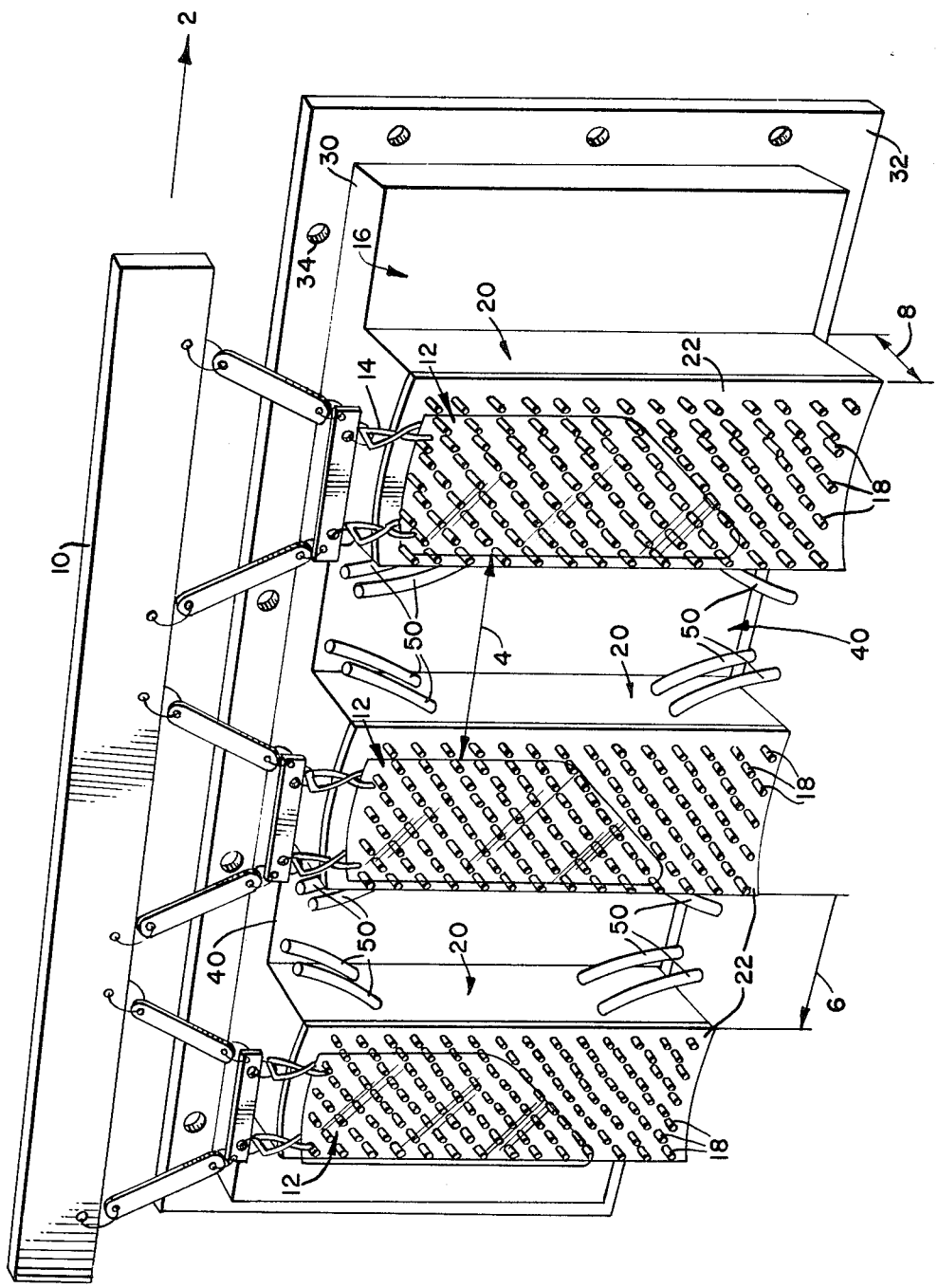
FIG. 1 is a perspective view of a compressed air caisson divided into three elementary caissons according to the present invention.

Referring now to FIG. 1, the distance 4 between two sheets is approximately 20 cm. Each of the diametrically opposed compressed air cooling caissons 16 includes three elementary compressed air caissons 20. The elementary caisson's front wall is characterized by small compressed air pipes 18. The stack pressure of the elementary caissons' compressed air is from 1500 to 1700 mm. of water during the glass hardening process. The small pipes have a length of about 80 mm. and about a 4 mm. diameter. Furthermore, the small pipe openings 18 are situated 3 cm. to 7 cm. from the glass sheets. The front walls 22 possess a curvature corresponding with the glass sheet convexity.

The elementary caissons 20 are arranged on an air distribution or wind box 30 which is equipped with a flange 32. The flange 32, with the help of pegs or screws penetrating the perforations 34, allows the attachment of one elementary caisson to the corresponding flange 36 of a rear caisson 60. The rear caisson communicates with a compressed air feed 70.

The elementary caissons 20 have a depth 8 of about 20 cm. to 30 cm. The distance between them 6 is from 15 cm. to 20 cm. These dimensions define vertical evacuation channels 40 into which the emitted compressed air can be evacuated both upwardly and downwardly away from the elementary caisson 20.

In another preferred embodiment, the compressed air outflow is assisted through the evacuation channels 40 via a suction means. Injectors 50 are attached to the lateral caisson walls, i.e., the upper and lower level wall portions forming the evacuation channels 40. These injectors 50 are tubular members in communication with the internal pressure of the compressed air caisson 20.

During operation, the compressed air emitted by means of the injectors 50 creates a suction effect in the evacuation channels 40. The compressed air flow emerging laterally from the area situated between the elementary caisson front wall 22 and the glass sheets 12 is improved due to the suction.

Figure 2:
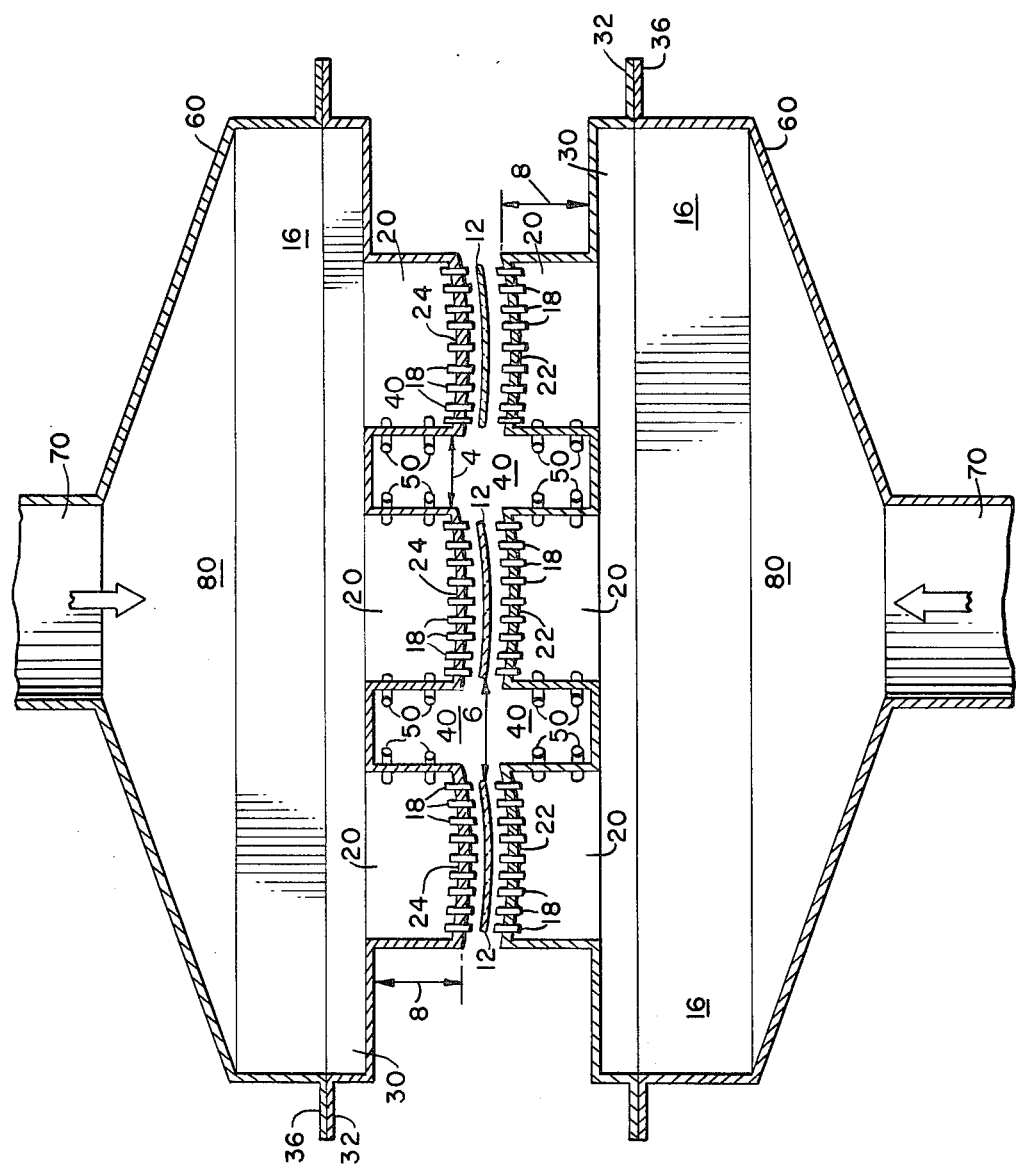
FIG. 2 is an overhead sectional view of the entire compressed air cooling apparatus with its two subdivided caissons to subdivide the diametrically opposed caissons.

FIG. 2 illustrates the assemblage of two diametrically opposed compressed air caissons. It should be noted that the front walls 22 of the diametrically opposed caissons have, respectively, two corresponding convex and concave curves. Furthermore, the caissons are advantageously maintained in an oscillatory movement perpendicular to the plane of the figure. The oscillations improve the cooling process uniformity of the entire glass sheet surface area.

While the invention has been described in connection with the preferred embodiments, it is not intended to limit the invention to the particular forms set forth, but, on the contrary, it is intended to cover such alternatives, modifications, and equivalents as may be within the spirit and scope of the invention as defined by the appended claims.

We claim:

1. An improved apparatus for simultaneous thermic hardening via rapid air cooling of a plurality of closely, vertically suspended glass sheets in a neutral position on a conveyor spaced generally along the direction of transport is characterized by an improvement comprising:
   a. a pair of compressed air caissons:
      i. positioned diametrically opposite each other,
      ii. having a plurality of compressed air pipes, and
      iii. dimensioned and configured whereby the caissons are divided into a plurality of elementary caissons; and
   b. the elementary caissons being:
      i. equivalent in number to the glass sheets to be simultaneously hardened and being spaced along the direction of transport,
      ii. dimensioned and configured such that the elementary compressed air caisson surface area does not appreciably extend beyond that area necessary for the hardening of the glass sheet,
      iii. joined to a common wind box, and
      iv. separated by evacuation channels of a sufficient dimension and configuration wherein the compressed air flow emitted via the front wall of each elementary caisson is unobstructed by the evacuation channels so as to avoid compressed air accumulation zones.

2. An improved apparatus for simultaneous thermic hardening via rapid air cooling of a plurality of closely vertically suspended glass sheets in a neutral position on a conveyor is characterized by an improvement comprising:
   a. a pair of compressed air caissons:
      i. positioned diametrically opposite each other,
      ii. having a plurality of compressed air pipes, and
      iii. dimensioned and configured whereby the caissons are divided into a plurality of elementary caissons; and
   b. the elementary caissions being:
      i. equivalent in number to the glass sheets to be simultaneously hardened,
      ii. joined to a common wind box, and
      iii. separated by evacuation channels being dimensioned and configured wherein the compressed air flow emitted via the front wall of each elementary caisson is unobstructed by the evacuation channels; and
   c. suction means acting in the evacuation channels, thereby facilitating the compressed air evacuation.

3. An improved apparatus for simultaneous thermic hardening via rapid air cooling of a plurality of closely vertically suspended glass sheets in a neutral position on a conveyor is characterized by an improvement comprising:

a. a pair of compressed air caissons;
  i. positioned diametrically opposite each other,
  ii. having a plurality of compressed air pipes, and
  iii. dimensioned and configured whereby the caissons are divided into a plurality of elementary caissons; and
b. the elementary caissons being;
  i. equivalent in number to the glass sheets to be simultaneously hardened,
  ii. joined to a common wind box,
  iii. separated by evacuation channels; and
c. suction means acting in the evacuation channels, thereby facilitating the compressed air evacuation.

4. An apparatus as recited in claim 3 or 2 wherein the suction means is characterized by compressed air injectors:

a. positioned on the wind box wall;
b. extending through the evacuation channels; and
c. directing compressed air from the feed into the evacuation channel.

5. An apparatus as recited in claim 4 wherein the injectors are characterized by tubular members in communication with the caisson.

6. An apparatus as recited in claims 1 or 4 wherein the elementary caisson front wall is characterized by a curvature dimensioned and configured to be corresponding to the glass sheet to be hardened.

7. An apparatus as recited in claim 3 or 2 wherein the elementary caisson front wall is characterized by a curvature dimensioned and configured to be corresponding to the glass sheet to be hardened.

8. A process for the simultaneous hardening by a compressed air flow of a plurality of adjacently suspended glass sheets on a common conveyor is characterized by:

a. suspending the glass sheets at spaced intervals generally along the direction of transport;
b. subjecting the glass sheets to a compressed air flow being of a surface area which does not appreciably extend beyond that area necessary for the hardening of each glass sheet;
c. discharging the compressed air flow into evacuation channels disposed generally between the spaced intervals at a flow sufficient to substantially prevent compressed air accumulation zones, the compressed air flow between unobstructed by the evacuation channels; and
d. moving the conveyor a multiple of the interval spacing.

9. A process as recited in claim 8 is characterized by an oscillatory movement parallel to the conveyor movement.

* * * * *